(12) United States Patent
Chen et al.

(10) Patent No.: US 9,346,925 B2
(45) Date of Patent: May 24, 2016

(54) EPOXY RESIN BLEND DISPERSION AND A PROCESS FOR PREPARING THE DISPERSION

(71) Applicant: Dow Global Technologies LLC, Midland, MI (US)

(72) Inventors: Liang Chen, Midland, MI (US); Liang Hong, Schwenksville, PA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/408,106

(22) PCT Filed: Jun. 24, 2013

(86) PCT No.: PCT/US2013/047275
§ 371 (c)(1),
(2) Date: Dec. 15, 2014

(87) PCT Pub. No.: WO2014/004358
PCT Pub. Date: Jan. 3, 2014

(65) Prior Publication Data
US 2015/0105492 A1 Apr. 16, 2015

Related U.S. Application Data

(60) Provisional application No. 61/666,008, filed on Jun. 29, 2012.

(51) Int. Cl.
| | |
|---|---|
| *C09D 163/00* | (2006.01) |
| *C09D 5/02* | (2006.01) |
| *C08L 63/00* | (2006.01) |
| *C08J 3/05* | (2006.01) |
| *C04B 26/14* | (2006.01) |
| *C08J 3/03* | (2006.01) |
| *C09D 7/02* | (2006.01) |
| *C09D 7/12* | (2006.01) |
| *C04B 24/28* | (2006.01) |
| *C08K 5/41* | (2006.01) |
| *C04B 28/02* | (2006.01) |
| *C04B 40/00* | (2006.01) |
| *B32B 27/38* | (2006.01) |
| *C04B 111/00* | (2006.01) |
| *C04B 111/20* | (2006.01) |
| *C04B 111/27* | (2006.01) |

(52) U.S. Cl.
CPC .............. *C08J 3/05* (2013.01); *C04B 24/281* (2013.01); *C04B 26/14* (2013.01); *C04B 28/02* (2013.01); *C04B 40/0039* (2013.01); *C08J 3/03* (2013.01); *C08K 5/41* (2013.01); *C08L 63/00* (2013.01); *C09D 5/027* (2013.01); *C09D 7/02* (2013.01); *C09D 7/1233* (2013.01); *C09D 163/00* (2013.01); *C04B 2111/00482* (2013.01); *C04B 2111/20* (2013.01); *C04B 2111/27* (2013.01); *C08J 2363/00* (2013.01); *C08J 2363/02* (2013.01); *C08J 2463/00* (2013.01)

(58) Field of Classification Search
None
See application file for complete search history.

(56) References Cited

U.S. PATENT DOCUMENTS

| | | | | |
|---|---|---|---|---|
| 3,772,228 | A | * | 11/1973 | Allen ................. C08G 59/4223 523/324 |
| 3,879,324 | A | * | 4/1975 | Timmons ................... C08J 3/03 523/402 |
| 3,983,056 | A | | 9/1976 | Hosoda et al. |
| 4,026,857 | A | | 5/1977 | Brown et al. |
| 4,123,403 | A | | 10/1978 | Warner et al. |
| 4,741,947 | A | * | 5/1988 | Pataki .................... C09J 163/00 428/195.1 |
| 4,751,258 | A | | 6/1988 | Minami |
| 5,118,729 | A | | 6/1992 | Piechocki |
| 5,252,637 | A | | 10/1993 | Craun et al. |
| 5,290,828 | A | | 3/1994 | Craun et al. |
| 5,344,856 | A | | 9/1994 | Klein |
| 5,387,625 | A | | 2/1995 | Parekh et al. |
| 5,708,059 | A | * | 1/1998 | Pfeil ...................... C08F 283/10 523/404 |
| 5,756,659 | A | | 5/1998 | Hughes et al. |
| 5,942,563 | A | | 8/1999 | DeGraaf |
| 6,271,287 | B1 | | 8/2001 | Piechocki et al. |
| 6,455,636 | B2 | | 9/2002 | Sanada |
| 2002/0074681 | A1 | | 6/2002 | Lundgard et al. |
| 2015/0299456 | A1 | * | 10/2015 | Chen ....................... C08L 63/00 523/453 |

FOREIGN PATENT DOCUMENTS

| | | | |
|---|---|---|---|
| EP | 2070984 A1 | 6/2009 | |
| GB | 1466292 A | * 3/1977 | ............. C08L 63/00 |
| WO | 9406876 A1 | 3/1994 | |
| WO | 9850477 A1 | 11/1998 | |
| WO | 2005085331 A1 | 9/2005 | |

* cited by examiner

*Primary Examiner* — Michael J Feely
(74) *Attorney, Agent, or Firm* — Andrew E.C. Merriam

(57) ABSTRACT

The present invention relates to an aqueous epoxy resin blend dispersion of a high mw epoxy resin and a liquid epoxy resin with a dispersant having an interfacial tension such that a drop of the mixture of the dispersant in a melt of the epoxy resin blend against water is less than 2 dynes/cm, preferably less than 1 dyne/cm, and a process for preparing this epoxy resin blend dispersion. Specifically, the process is a solvent free melt kneading or shearing dispersion process wherein the dispersion is processed at from 50 to 150° C., and the resulting dispersion is stable.

9 Claims, No Drawings

EPOXY RESIN BLEND DISPERSION AND A PROCESS FOR PREPARING THE DISPERSION

The present invention relates to epoxy resin blend aqueous dispersions, and to processes for preparing the epoxy resin blend dispersions. More specifically, the dispersion process is solvent free and produces a stable dispersion.

Polymeric binders are valuable additives in formulations of cementitious materials such as mortar, grout and concrete for the purpose of enhancing final properties of the resulting material. Epoxies, for example, are desirable additives in cementitious formulations to increase toughness, reduce water permeability and/or increase chemical and stain resistance in cementitious materials. Epoxies can be added to a cementitious formulation as an aqueous dispersion. Well known epoxy modified cement products usually contain 3 parts: an aqueous epoxy dispersion, an aqueous amine hardeners, and a dry mix of sand and cement. On the other hand, the high alkali content of hydrated cement can promote the crosslinking of the epoxy groups, thereby enabling amine-free cementitious formulations containing epoxy dispersion. More commonly, aqueous epoxy dispersions cured by amine hardeners are used in coating applications. Many cured epoxy coatings in aqueous systems have some drawbacks such as poor fracture toughness and low impact strength. This has limited their application in areas requiring high impact and fracture strengths, such as reinforced plastics and industrial coatings.

High Mw epoxy resins are flexible upon curing and greatly enhance the toughness of cured epoxy resin films. However, it is challenging to introduce high Mw epoxy resins in solvent-free aqueous coatings because of their high glass transition temperature (Tg) and their lack of film forming properties at room temperature or ambient use temperatures. Generally, the use of high Mw epoxy resins is limited to solvent-borne applications where a significant amount of solvent is used to dissolve them.

Applicants have sought to solve the problem of providing aqueous epoxy resin dispersions that display good toughness when cured in a coating at room temperature, and solvent-free processes for making the epoxy resin dispersions.

SUMMARY OF THE INVENTION

The present invention provides aqueous epoxy resin dispersions comprising, based on the total solids weight in the epoxy resin dispersion i) from 20 wt. % to 80 wt. %, preferably, from 30 wt. % to 70 wt. %, of a high molecular weight (Mw) epoxy resin; ii) from 30 wt. % to 80 wt. %, preferably, from 40 wt. % to 70 wt. %, of a liquid epoxy resin; and iii) from 2 wt. % to 20 wt. %, preferably, from 3 wt. % to 15 wt. %, or, more preferably, from 4 wt. % to 12 wt. %, of a dispersant having an interfacial tension such that a drop of the mixture of the dispersant in a melt of the high Mw and liquid epoxy resin blend against water is less than 2 dynes/cm, preferably less than 1 dyne/cm. The high Mw epoxy resin has an epoxide equivalent weight (EEW) of from 1000 to 10000 g/eq, preferably, from 1500-8000 g/eq, or, more preferably, 2000-6000 g/eq and a weight average molecular weight of from 3000 to 40000 g/mol, preferably, from 6000-30000 g/mol, or, more preferably, from 9000-20000 g/mol; and the liquid epoxy resin has an epoxide equivalent weight (EEW) of from 100 to 300 g/eq, preferably, from 120 to 200 g/eq, or, more preferably, from 150 to 200 g/eq and a weight average molecular weight of from 200 to 600 g/mol, preferably, from 240-400 g/mol, or, more preferably, from 300-400 g/mol.

The epoxy resin dispersion has a particle size of from 0.1 to 5 μm, preferably, from 0.2 to 2.0 μm, or, more preferably, from 0.3 to 1.0 μm.

The epoxy resin may be a polyglycidyl ether of a polyhydroxy compound and is preferably Bisphenol-A diglycidyl ether or Bisphenol-F diglycidyl ether or polyglycol diglycidyl ether. A suitable polyhydroxy compound is any polyol having 2 or more than 2 hydroxyl groups, preferably Bisphenol A or Bisphenol F or a polyglycol such as polyethylene glycol or polypropylene glycol having from 2 to 20 ethylene glycol or propylene glycol groups.

In another aspect, the present invention further provides solvent-free dispersion processes comprising: i) providing a high Mw epoxy resin with an epoxide equivalent weight of from 1000 to 10000 g/eq, or, preferably, from 1500 to 8000 g/eq, or, more preferably, from 2000 to 6000 g/eq, and a weight average molecular weight of from 3000 to 40000 g/mol, preferably, from 6000 to 30000 g/mol, or, more preferably, from 9000 to 20000 g/mol; ii) providing a liquid epoxy resin with an epoxide equivalent weight of from 100 to 300 g/eq, preferably, from 120 to 200 g/eq, or, more preferably, from 150 to 200 g/eq and a weight average molecular weight of from 200 to 600 g/mol, preferably, from 240 to 400 g/mol, or, more preferably, from 300 to 400 g/mol; iii) providing from 2.0% to 20%, preferably from 3 wt. % to 15 wt. %, more preferably, from 4 wt. % to 12 wt. % based on the total solids weight of the epoxy resin dispersion, of a dispersant such that a drop of the dispersant in a melt of the high Mw and liquid epoxy resin blend at the concentration of dispersant in epoxy resin being processed (i.e. 4 wt. %) has an interfacial tension against water of less than 2 dynes/cm, preferably less than 1 dyne/cm within the processing temperature range; iv) providing water from 4 to 25 wt. %, or, preferably, from 5 to 20 wt. % in the total weight of the epoxy dispersions; v) and emulsifying the epoxy resin composition in the water in the presence of the dispersant melt blending the high Mw and the liquid epoxy resins under conditions sufficient to melt the high Mw epoxy resin, preferably, 50 to 150° C., to produce a high internal phase emulsion.

The melt blending can take place before or while adding dispersant, before adding water, while adding water, or any combination thereof.

The process may further comprise adding additional water to dilute the dispersions so that 30 to 60 wt. %, or, preferably, from 40 to 55 wt. % by weight of water in the total weight of the epoxy dispersions. Preferred dispersion devices include a multi screw extruder having two or more screws and rotor stator mixer and pressurized high shear device.

The present invention further provides coating compositions comprising the aqueous epoxy resin dispersion of the present invention and cement compositions comprising the aqueous epoxy resin dispersion and hydraulic binder or cement.

Unless otherwise indicated, all temperature and pressure units are room temperature and standard pressure (STP). All ranges recited are inclusive and combinable.

For epoxy resins, unless otherwise indicated, the molecular weight refers to a weight average molecular weight as determined by gel permeation chromatography (GPC) combined with static light scattering (absolute method) based on polystyrene standards.

As used herein, the term "aqueous" means water or water mixed with 10 wt. % or less, or, preferably, 5 wt. % or less, or, more preferably, 1 wt. % or less, of one or more water miscible solvent. The term "solvent free" means that the resulting dispersion has less than 1000 ppm of solvent, preferably, less than 500 ppm solvent.

As used herein, the term "epoxide equivalent weight" refers to the value determined by ASTM D-1652 (1997). "ASTM" refers to ASTM International, West Conshohocken, Pa.

As used herein, the term "particle size" refers to a mean volume-average particle size as determined by laser diffraction according to ISO 13320-2009 using a Coulter Counter particle size and count analyzers. "ISO" refers to International Organization for Standardization (Geneva, Switzerland). Test method numbers refer to the most recent test published prior to the priority date of this document unless otherwise specified by a date using a hyphenated suffix after the test method number.

As used herein, the term "total solids weight of the epoxy resin dispersion" refers to epoxy resin and dispersant solids.

As used herein, the term "wt. %" refers to weight percent.

The epoxy resin dispersion of the present invention comprises based on the total solids weight of the epoxy resin dispersion, from 20% to 80%, preferably from 30% to 70%, and most preferably from 30% to 60%, a high Mw epoxy resin.

The epoxy resin dispersion of the present invention further comprises based on the total solids weight of the epoxy resin dispersion, from 30% to 80%, preferably from 40% to 70%, most preferably from 40% to 60%, a liquid epoxy resin.

The epoxy resin dispersion of the present invention further comprises based on the total solids weight of the epoxy resin dispersion, from 2% to 20 wt. %, preferably from 3% to 15%, and most preferably from 4% to 12%, of a dispersant.

Within the meaning of the present invention the epoxy resin for use herein is a polyglycidyl ether of a polyhydroxy compound or polyol, such as a monomeric polyhydroxy compound e.g. a polyol, or a hydroxyl-functional oligomer. Preferably, the polyglycidyl ether is an oligomeric or polymeric compound having at least 2 glycidyl groups. Typically, the epoxy resin is the reaction product of a polyhydroxy compound, such as a glycol, or a hydroxyl-functional oligomer, with an epihalohydrin, such as epichlorohydrin. The polyol can be substituted, if desired, with one or more non-interfering substituents, such as halogen atoms, ether radicals, lower alkyls and the like. Examples of suitable polyols include polyhydric phenols and polyhydric alcohols. Specific non-limiting examples of monomeric polyols are resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, tetra-methylbiphenol, tetramethyl-tetrabromobiphenol, tetramethyl tribromobiphenol, tetrachlorobisphenol A, 4,4'-sulfonyldiphenol, 4,4-oxydiphenol, 4,4'-dihydroxybenzophenone, 9,9'-bis(4-hydroxyphenyl)fluorine, 4,4'-dihydroxybiphenyl, and 4,4'-dihydroxy-α-methylstilbene. Examples of hydroxyl-functional oligomers include phenol-formaldehyde novolak resins, alkyl substituted phenol-formaldehyde resins, phenol-hydroxybenzaldehyde resins, cresol-hydroxybenzaldehyde resins, dicyclopentadiene-phenol resins, and dicyclopentadiene-substituted phenol resins. The polyglycidyl ethers can be prepared by reacting an epihalohydrin, preferably epichlorohydrin, with the polyhydroxy compound including a halogenated polyhydroxy compound under such conditions to prepare the desired product. Such preparations are well known in the art (see for example U.S. Pat. No. 5,118,729, columns 4-7 and "Epoxy resins" by Pham, H. Q. and Marks, M. J. in Ullmann's Encyclopedia of Industrial Chemistry, Wiley-VCH Verlag, Weinheim, 2005). Modified epoxy resins such as epoxy resins wherein part of the above mentioned fundamental reactants has been substituted by modified compounds are also encompassed by the term "epoxy resin". Oligomers and polymers obtained by free radical polymerization of monomer mixtures comprising ethylenically unsaturated epoxy compounds are not included by the definition of epoxy resin herein.

In accordance with the present invention, the polyol used to prepare the epoxy resin is, preferably, an aromatic dihydroxy compound, such as bisphenol A and/or bisphenol F. An oligomeric or polymeric compound such as a phenol-formaldehyde novolac may be used as the polyhydroxy compound. Preferred examples of epoxy resins for use in the present invention include the diglycidyl ether of bisphenol A which is an oligomer of diglycidylether of bisphenol A, typically the reaction product of epichlorohydrin and bisphenol A; the diglycidyl ether of bisphenol F which is an oligomer of diglycidyl ether of bisphenol F, typically the reaction product of epichlorohydrin and bisphenol F; a mixed diglycidyl ether of bisphenol A and F, which is an oligomer of diglycidyl ether of bisphenol A and F, typically the reaction product of epichlorohydrin and a mixture of bisphenol A and F; the diglycidyl ether of a phenol-formaldehyde novolak which is an oligomer or polymer of diglycidyl ether of a phenol-formaldehyde novolac, typically the reaction product of epichlorohydrin and a phenol-formaldehyde novolac; and modified epoxy resins such as epoxy resins, e.g. bisphenol A based epoxy resins, modified with an epoxy functional surfactant, typically an epoxy functional nonionic or epoxy functional anionic surfactant, and/or poly(alkylene glycol) epoxide, typically poly(propylene glycol) epoxide or poly(ethylene glycol) epoxide. In embodiments of the invention, the thermosettable epoxy resin is a linear, non-cross-linked polymer of bisphenol A and epichlorohydrin having terminal epoxide groups. A specific example of a thermosettable epoxy resin which may be employed herein is D.E.R. 664U, a solid epoxy resin of medium molecular weight, which is the solid reaction product of epichlorohydrin and bisphenol A, having a softening point of 100° C. to 110° C., commercially available from The Dow Chemical Company, Midland, Mich.

The high Mw epoxy resin of the present invention has an epoxide equivalent weight of from 1000 to 10000 g/eq preferably 1500-8000 g/eq, more preferably 2000-6000 g/eq and a weight average molecular weight of from 3000 to 40000 g/mol preferably 6000-30000 g/mol, more preferably 9000-20000 g/mol.

The liquid epoxy resin has an epoxide equivalent weight of from 100 g/eq to 300 g/eq, more preferably, from 120 g/eq to 200 g/eq, and a molecular weight of from 200 to 600, more preferably, from 240 to 400, may be further employed. The epoxide equivalent weight is determined according to ASTM D 1652 (1997), and the molecular weight is a weight average molecular weight determined according to gel-permeation chromatography (GPC) using polystyrene standards.

The dispersant suitable for the present invention is any that will maintain its effectiveness under melt processing conditions (e.g. at 50-150° C., preferably from 60 to 120° C.) when preparing the epoxy dispersion. Such dispersants include nonionic surfactants and ionic dispersants that exhibit an interfacial tension of a drop of a solution of the dispersant in a liquid Bisphenol-A epoxy resin that is being processed (the concentration of dispersant in epoxy resin being processed i.e. 4 wt. %) against water of less than 2 dynes/cm, preferably less than 1 dyne/cm within the processing temperature range.

Dispersants useful in the practice of the present invention include, but are not limited to cationic surfactants having a hydrophobic group and from 2 to 40 ethoxy units, anionic surfactants having a hydrophobic group and from 2 to 40 ethoxy units, or non-ionic surfactant copolymers of ethylene oxide and propylene oxide dispersants having a molecular weight of from 7,000 to 20,000.

Examples of anionic surfactants include, but are not limited to, sulfonates, carboxylates, and phosphates. Examples of cationic surfactants include, but are not limited to quaternary amines.

Examples of non-ionic surfactants include, but are not limited to, block copolymers containing ethylene oxide, epoxy (or amine or acid) group functional ethylene oxide copolymer.

Commercially available dispersants may be used in the embodiments of the present invention include: E-SPERSE 100, E-SPERSE 700, E-SPERSE 701 ethoxylated di- and tristyrenated phenol from Ethox Chemicals LLC. PROX™ ES 100 dispersant (alkylphenol ethoxylate-free epoxidized surfactant) from Synthron (a subsidiary of Protex International, France). Nonionic copolymers of ethylene oxide and propylene oxide dispersants having a molecular weight of from 7,000 to 20,000, for example ATSURF 108 dispersant (block copolymers based on ethylene oxide and propylene oxide) (Imperial Chemical Industries PLC (ICI), now AkzoNobel), PLURONIC F 108 dispersant (ethylene oxide and propylene oxide block copolymers) (BASF Corp.), and polyepoxy Emulsifier 551 dispersant (glycidyl ether of copolymer of ethylene oxide and propylene oxide) (The Hanson Group, LLC). MOWIOL 4-88 polyvinyl alcohol commercially available from Kuraray Europe GmbH, may be used as the dispersant.

The polymer composition according to the present invention may comprise a single nonionic surfactant or a single ionic dispersants or a mixture of these.

The dispersant is present in the epoxy dispersion at a concentration of 2 wt % or more, preferably 3 wt % or more, still more preferably 4 wt % or more while at the same time is generally present at a concentration of 20 wt % or less, preferably 15 wt % or less, and more preferably 12 wt % or less with wt % relative to total weight of the dispersion solids.

The preparation of the stable aqueous high Mw epoxy resin blend dispersion comprises conventional mechanical dispersion of a high Mw epoxy resin, with a liquid epoxy resin, and a dispersant, in the presence of water under conditions sufficient to melt the blend of high Mw and liquid epoxy resins. The mechanical dispersion can be heated to 50° C. or higher and up to 150° C. The high Mw epoxy resin and liquid epoxy resin can be melt blended first before dispersion at above the melting point of the high Mw epoxy resin or mixed in situ with dispersant any water present in the mixer or kneader and dispersed. Suitable mechanical dispersion methods may include shearing and, if desired, heating the high Mw epoxy resin, the liquid epoxy resin, and the dispersant, with or without water, above the melting temperature (Tm) of the high Mw epoxy resin, or processing at a temperature that with shearing will heat the high Mw epoxy resin to melt, and form an aqueous high Mw epoxy resin blend dispersion, followed, if needed, by diluting the aqueous high Mw epoxy resin with water while shearing the resulting mixture to form an aqueous high Mw epoxy resin dispersion.

Suitable shearing methods include extrusion and melt kneading in a known manner including, for example, in a kneader, a Banbury mixer, single-screw extruder, or a multi-screw extruder. The melt kneading may be conducted under the conditions which are typically used for melt kneading a high Mw epoxy resin. A preferred melt-kneading machine is, for example, a multi screw extruder having two or more screws, to which a kneading block can be added at any position of the screws. If desired, an extruder may be provided with a first material-supplying inlet, such as for the high Mw epoxy resin and solid dispersant, a second material-supplying inlet, such as for liquid epoxy resin and liquid dispersant, and further third and forth material-supplying inlets in this order from the upstream to the downstream along the flow direction of a material to be kneaded. Further, a vacuum vent may be added.

Water is added to make a high internal phase emulsion that contains water from 4 to 25 wt. %, or, preferably, from 5 to 20 wt. % in the total weight of the epoxy dispersions. The high internal phase emulsion can subsequently be further diluted to comprise greater than 40% by weight of water.

Exemplary methods for preparing stable aqueous high Mw epoxy resin dispersions are also disclosed in, for example, U.S. Pat. Nos. 3,360,599, 3,503,917, 4,123,403, 5,037,864, 5,539,021, and WO 2005085331A. Melt kneading methods are disclosed, for example, in U.S. Pat. Nos. 5,756,659 and 6,455,636.

Preferably, the stable aqueous epoxy resin dispersion is formed in the absence of any organic solvent.

Preferably, to form a mechanical dispersion, a high Mw epoxy resin (a solid epoxy resin in the present invention) is supplied to the feed throat of the extruder via a loss-in-weight feeder, such as a Schenck Mechatron feeder (Whitewater, Wis.) and then melt blended. When the dispersant is in solid state, it is fed together with high Mw epoxy resin.

In extrusion, a liquid epoxy resin stream is injected into a melt zone to melt blend with the high Mw epoxy resin before entering the emulsification zone. An initial aqueous stream (IA) is then injected into the extruder after the melt blend zone and melt blended epoxy resin is then emulsified in the presence of IA, and thereby produces a high internal phase emulsion (HIPE). When the dispersant is in liquid state, it is fed together with the liquid epoxy resin stream or the initial aqueous stream. The emulsion phase is then conveyed forward to the dilution and cooling zone of the extruder where additional water is added to form the aqueous high Mw epoxy resin dispersions having solid level contents in the range of from 30 wt. % to less than 70 wt. %. The initial aqueous stream, the dilution water, the dispersant, when being solutions, and the liquid epoxy resin, are all supplied by high pressure positive displacement pumps, such as ISCO dual syringe pumps (500 ml), or Gear pumps of Zenith Pumps Division, Parker Hannifin Corporation (Monroe, N.C.).

Suitable other mechanical dispersion equipment may comprise a pressurized high shear device such as a PARR reactor (manufactured by The Parr Instrument Company, Moline, Ill.) with high shear mixing blades e.g. Cowles blades, a modified extruder system, or rotor stator device. For example, a PARR stainless steel pressure reactor with a Cowles blade, or stirrer blade with serrated teeth, equipped with an optional pulley system to allow mixer speeds of up to 1830 rpm, or more; heating and cooling devices may also be employed to make the aqueous epoxy resin dispersions. Preferably, the reactor may be sealed and heated to heat the high Mw epoxy resin and liquid epoxy resin and dispersant above its melting point and produce a liquid; it may be heated, for example to 60° C. or more, and up to 200° C., so as to induce shear and bring the temperature of the high Mw epoxy resin above its Tm. After reaching the desired temperature the mixture may be stirred for a sufficient amount of time, e.g. 2 to 30 minutes, to allow sufficient mixing of the epoxy resins and the dispersant. To this mixture water may be added using a HPLC pump, to obtain a substantially homogeneous mixture. Water addition may be continued while cooling the reactor by air and water, down to a temperature of, for example 50° C., with stirring being maintained during the cooling process, to obtain a substantially homogeneous dispersion.

In another method of forming the dispersions, the epoxy resins and a dispersant may in molten form be fed into a first mixing device, such as a rotor stator mixer, and brought into contact with water, and optionally a co-dispersant, thereby forming a high internal phase emulsion. Subsequently, additional water is added to or mixed with the high internal phase emulsion, thereby producing the epoxy dispersion of the present invention. The one or more said epoxy resins may be melted via, for example, a melt pump.

The aqueous epoxy resin blend dispersion of the present invention has an average particle size of from 0.1 to 5 μm, or, preferably, from 0.2 to 2 μm, or, more preferably, from 0.3 to 1.0 μm.

The epoxy resin of the present invention may be used, for example, in coating applications such as industrial coating applications, and automotive coating applications.

The epoxy resin dispersions according to the present invention are film forming compositions at room temperature. The films derived from the inventive epoxy resin dispersion may have any thickness; for example, such films may have a thickness in the range of from 0.01 μm to 1 μm; or in the alternative, from 1 μm to 500 μm; or in the alternative, from 1 μm to 100 μm; or in the alternative, from 1 to 50 μm; or in the alternative, from 1 μm to 25 μm; or in the alternative, from 1 to 10 μm.

Methods for coating articles or structures according to the present invention may comprise selecting the epoxy resin dispersion mixing epoxy dispersion and amine hardener and other additives at desired ratios, applying the epoxy resin dispersion to one or more surfaces of an article or a structure; and removing a portion of water from the epoxy resin dispersion associated with one or more surfaces of the article or structure.

The epoxy resin dispersions may be applied to one or more surfaces of an article or a structure via any method. Such methods include, but are not limited to, spraying, dipping, rolling, brushing, and any other conventional technique generally known to those skilled in the art. The inventive epoxy resin dispersion may be applied to one or more surfaces of an article or structure at a temperature in the range of greater than about 5° C. Such structures include, but are not limited to, commercial building, residential buildings, and warehouses. The inventive epoxy resin dispersions may be used as coatings for interior applications, exterior applications, or combinations thereof. The surface of such structures to be coated with the inventive epoxy resin dispersion may comprise concrete, wood, metal, plastic, glass, drywall, or the like.

Amine hardeners, as epoxy curing agents, for example, as disclosed in U.S. Pat. No. 4,197,389, can be included. Suitable amine hardeners can be aliphatic, cycloaliphatic and heterocyclic polyamine, or its adduct with one polyepoxide compound.

The epoxy resin dispersions of the present invention may be formulation into clear coatings, i.e. pigment-free coatings or coatings only containing nano-scale pigmentation. Pigments can also be included in the formulation to make pigmented coatings. Pigments that can be used include standard coating pigments such as inorganic (e.g. anticorrosives, $TiO_2$, ZnO, clays, silicates, carbonates, and the like), and organic (e.g. hollow-core or solid polymeric particles) pigments.

Other additives may be further included in the coating compositions. These additives include, but are not limited to rheology modifiers, defoamers, "solvents" (not for coalescence necessarily, but for wetting, open time, etc), additional surfactants, and colorants.

The aqueous epoxy resin blend dispersions may also be added to cementitious formulations. In construction applications, mortars may be prepared with cement, sand, and, as organic polymer, the aqueous epoxy resin dispersions. An amine hardener may be included. In one example, high alkaline conditions in the cement can trigger epoxy cure in an amine-free cement formulation with epoxy modification is also possible. For example, such aqueous epoxy resin dispersions can be blended with concrete or mortar to impart desirable low water permeability and ready-mix truck deliverability to the modified concrete or mortar.

The following examples are provided for illustrative purposes only and are not intended to limit the scope of the claims that follow. Unless otherwise indicated, all parts and percentages are by weight and all temperatures are in ° C.

EXAMPLES

I. Raw Materials

Dispersants used in experiments are summarized below

| Trade name | Chemical nature | Function | Type | Form | Supplier |
|---|---|---|---|---|---|
| ATSURF 108 | Nonionic PEO-PPO-PEO surfactant | dispersant | Non-ionic | Solid | Akzo Nobel |
| E-SPERSE 100 | PEO (14) di- and tristyrenated Phenol ammonium sulfate | dispersant | Anionic | Liquid | Ethox Chemicals |
| E-SPERSE 700 | PEO (40) di- and tristyrenated Phenol | dispersant | Non-ionic | Liquid | Ethox Chemicals |

Epoxy resins used in experiments are summarized below

| Commercial name | Chemical nature | Function | Supplier | EEW (g/eq) | Mw (g/mol) |
|---|---|---|---|---|---|
| D.E.R. ™ 330 | diglycidyl ether of bisphenol A | Liquid epoxy resin | Dow | 176-185 | 370 |
| D.E.R. ™ 331 | | Liquid epoxy resin | Dow | 182-192 | 380 |
| D.E.R. ™ 736 | Polymer of epichlorohydrin-polyglycol | Liquid epoxy resin | Dow | 175-205 | N/A |
| D.E.R. ™ 667E | diglycidyl ether of bisphenol A | Solid epoxy resin | Dow | 1600-1950 | 10000 |

| Commercial name | Chemical nature | Function | Supplier | EEW (g/eq) | Mw (g/mol) |
|---|---|---|---|---|---|
| D.E.R. ™ 669E | | Solid epoxy resin | Dow | 2500-4000 | 15000 |
| D.E.R. ™ 671 | | Solid epoxy resin | Dow | 475-550 | N/A |

EEW: epoxy equivalent weight (gram/equivalent);
Mw: weight average molecular weight;
All the epoxy resin samples are Bisphenol-A based epoxy resins, except D.E.R. ™ 736 is a liquid reaction product of epichlorohydrin and dipropylene glycol.

A. Batch Epoxy Dispersion Process

Epoxy blend dispersions were prepared in a PARR reactor in a batch-wise dispersion process. A 300 mL PARR stainless steel pressure reactor (Parr Instrument Co.) with a 2.625" inside diameter and a Cowles blade, equipped with a pulley system to allow mixer speeds of up to 1825 rpm was employed. To make the dispersions 50.0 g of epoxy resin and various amounts of different surfactants (listed in Table 1) were charged into the PARR reactor. The stirrer assembly was inserted into the vessel. The PARR reactor assembly was then loaded onto its ring stand and water hoses were attached to the stirrer's cooling sleeve. The thermocouples and stirrer motor were connected, and the heating mantle was lifted into place and tightened. With this mixer setup, the reactor was sealed and heated to 100° C., and the mixture was stirred for 10 minutes to allow sufficient mixing of the epoxy resin and the dispersant at full mixing speed. To this mixture water was added using a HPLC pump at a rate of 1 mL/min for 20 minutes. The water addition rate was increased to 10 mL/min for 3-4 minutes while the heating mantle was removed and the PARR reactor was cooled down to room temperature. The resultant dispersion was collected by filtration through a 200 μm filter.

B. Continuous Extruder-Based Epoxy Dispersion Process

The Epoxy Dispersions were prepared using a KWP (KRUPP WERNER & PFLEIDERER) ZSK25 extruder (60 L/D rotating at 450 rpm) according to the following procedure with the formulation components shown in Table 1, below. The solid epoxy resin and the solid dispersant (semi-crystalline MOWIOL 488 or ATSURF 108) were supplied to the feed throat of the extruder via a Schenck Mechatron loss-in-weight feeder and then melted blended, and a liquid epoxy stream was injected into the melt zone to melt blend with solid epoxy and dispersant before entering the emulsification zone. The initial aqueous stream (IA) was then injected into the emulsification zone, and the melt polymer blend was then emulsified in the presence of water in the extruder. Liquid dispersant (or co-dispersant) can be injected into the emulsification zone together with IA. The emulsion phase was then conveyed forward to the dilution and cooling zone of the extruder where additional water was added to form the aqueous dispersions having solid level levels of less than 60 weight percent. The properties of each of the dispersion components were measured, and are reported in Table 1. The initial water, liquid dispersants like E-SPERSE 100, and dilution water were all supplied by ISCO dual syringe pumps (500 ml). The barrel temperature of the extruder was set to 100° C. After the dispersion exited the extruder, it was further cooled and filtered via a 200 μm mesh size bag filter.

Particle size analysis was conducted on the Beckman Coulter LS 13 320 Laser Light Scattering Particle Sizer (Beckman Coulter Inc.) using the standard procedure (ISO 13320-2009). Dispersion pH was measured using a Denver Instruments pH meter. Solids analysis was performed with an Ohaus MB45 moisture analyzer. Viscosity was measured on a Brookfield rotational viscometer at stated conditions.

Clear Coating Preparation:

Cold roll steel panels were supplied by Q-panel corporation and used for all experiments, and used for hardness, adhesion, mandrel bend, and impact tests. 0.5% Acrysol RM-825 and 0.5 wt % Tego wet 280 based on the solid epoxy solid was added into the mixture to improve coating wetability and rheology. Epoxy resin and hardener were mixed in a 1:1 epoxy-to-amine ratio and mixed by a speed mixer at 2500 rpm for 2.5 min. Unless otherwise mentioned, all coatings were within 10-30 minutes after mixing of the epoxy and hardener components. Approximately 4 mL of coating formulations were applied on the top of the panel and were drawn down (10 mil draw down bar, 1 mil=25.4 μm) across the panel. The wet panel was allowed to dry at 7 days within a ventilated hood at ambient temperature followed by accelerated curing at 60° C. for 20 hours, prior to coating tests.

The following ingredients were used:

OUDRACURE™ WB 8001: Aqueous polyamine adduct of an epoxy resin amine hydrogen equivalent weight (ANEW); of 300 as determined by titration Dow Chemical (Midland, Mich.).

ACRYSOL™ RM-825: hydrophobic ethoxylated urethane rheology modifier (HEUR) (25% solid in Water/Butyl Carbitol (75/25)), commercially available from Dow Chemical.

TEGO™ Wet 280: substrate wetting additive (polyether-modified siloxane) Evonik Tego Chemie GmbH.

DISPERBYK 194 from BYK Additives&Instruments: aqueous solution of a pigment dispersant copolymer.

BYK-019 from BYK Additives&Instruments: Silicone defoamer for aqueous pigment concentrates and printing inks.

TEGO AIREX 902W by Evonik Tego Chemie: polyether siloxane copolymer defoamer.

TI-PURE R-706: DuPont TI-PURE™ R-706 is a universal rutile titanium dioxide pigment, manufactured by the chloride process.

DOWANOL™ PnP: propylene glycol propyl ether is commercially available from Dow Chemical.

White Enamel Screening Formulation:

Two aqueous solid epoxy dispersions were studied: A solvent-free aqueous solid epoxy dispersion from Dow (Dispersion E in Table 1), and an experimental solvent-free aqueous solid epoxy dispersion (Dispersion D in Table 1) containing high Mw solid epoxy resin. An example of the model formation is shown in the table below. The study used an 18% PVC (pigment-to-volume concentration), and 40.5% volume solid formulation. Epoxy resin and hardener were mixed in a 1:1 epoxy-to-amine ratio. Unless mentioned otherwise, all coatings were applied in the time interval within 30-60 minutes after mixing of the epoxy and hardener components. The formulations and key properties for the three coatings are provided in Table 2, below. Paint A had to contain higher final VOC level than paint B, to achieve a similar film formation temperature.

TABLE 1

| Ingredients (lbs) | Paint A | Paint B |
|---|---|---|
| Part A | | |
| Water | 70 | 70 |
| Sodium Nitrite (15%) | 9.26 | 9.26 |
| DISPERBYK 194 | 29.57 | 29.57 |
| BYK-019 | 2.06 | 2.06 |
| Ti-Pure R-706 | 243.40 | 243.40 |
| Dow waterborne epoxy dispersion (Dispersion E) | 540.88 | |
| Experimental epoxy dispersion (Dispersion D) | | 364.72 |
| Tego AIREX 902W | 4.42 | 4.53 |
| Part B | | |
| OUDRACURE 8001 | 152.53 | 206.45 |
| Water | 1.19 | 120.02 |
| DOWANOL PnP | 18.00 | |
| VOC (g/l) | 50 | 2 |

Testing Methods:

Testing was performed following test methods. Draw downs were at 254 μm (10 mil) wet film thickness, with resultant dry film thickness of about 40-75 μm (1.8-3 mil).

Hardness:

Pencil hardness was determined as discussed in ASTM D3363 (2005). Coatings were applied to BONDERITE™ phosphate (Henkel Kgaa) pre-treated metal panels, and hardness was measured after curing at 77° F. and 50% relative humidity (% RH) prior to testing. HB or higher hardness is an acceptable result, at least 3B hardness is preferred.

Conical Mandrel Test:

A 250 micron (10 mil) wet film was applied to a Bonderite™ (Iron Phosphate, Henkel KgaA, Düsseldorf, DE) treated metal panel, and after curing for 7 days at 77° F. and 50% RH, and flexibility was determined via ASTM D522 (2008). Used to test the resistance of a coating of paint, varnish or related product to cracking or detachment from a metal panel, after the panel has been bent around a cylindrical mandrel. It can be used as a simple Pass/Fail test at a known diameter.

MEK Double Rub:

Evaluation for Solvent Resistance by Solvent Rub Test—ASTM D4752 (2003). The Solvent Rub Test is usually performed using methyl ethyl ketone (MEK) as the solvent. The MEK resistance or degree of cure applies to paint topcoats and primers. >50 MEK double rub is an acceptable result, and >200 MEK double rub is preferred.

Impact Resistance: (ASTM D-2794 (2010))

Impact resistance was measured on cured coatings on steel panels using a falling weight impact tester. Impacts were made indirectly or directly on the coating surface from various heights, and the maximum height without causing damage multiplying the weight of the dart yields the force of impact resistance (in inch-lb or Joule). The impact tester was used to test coating for crack formation, breaking off, adhesion and elasticity. 2.0 Joule is an acceptable result, and 4 Joule is preferred.

Example 1

Epoxy Blend Dispersions

Epoxy blend dispersions were prepared by both batch and continuous dispersion processes and summarized in Table 1. High Mw solid epoxies (at least EEW>1500, Tg>72° C.) were used in an aqueous form to provide improved toughness in aqueous epoxy coating after curing, in comparison with a low Mw epoxy aqueous dispersion. As summarized in Table 2, below, high Mw solid epoxy resins were blended with low Mw liquid epoxy resin at the given ratios and then mechanically dispersed in water according to the batch and continuous extruder-based process, above.

Preferably, the Tg of the epoxy blend is lower than ambient temperature. The glass transition temperature (Tg) of the epoxy blend is determined by the epoxy composition, which is predicted by the Fox equation, as follows:

$$1/Tg = w/T_{g,solid} + (1-w)/T_{g,liquid},$$

where "w" is the weight % of solid epoxy resin in the blend. Tg is calculated in degrees Kelvin.

A binary blend of Bisphenol A epoxy resins, at maximum 60% of high Mw (Mw>9000 g/mol) solid epoxy retains film forming ability. Homogeneous epoxy blend dispersions with submicron particle sizes resulted. In comparison, OudraSperse™ 6001 (Dow Chemical) solid epoxy waterborne dispersion (of D.E.R.™ 671 type 1, low molecular weight solid (Mw~1500 g/mol) Bisphenol-A epoxy resin was used.

TABLE 2

Epoxy blend dispersions

| Dispersion | Epoxy Resin[A] | Dispersant/ Loading %[B] | Particle size (nm) | Mw[D] (kg/mol) | EEW[E] |
|---|---|---|---|---|---|
| A | D.E.R.667E/D.E.R.331/ D.E.R. 736 (6:3:1) [C] | E-SPERSE 100 4% | 350 | 6.2 | 918 |
| B | D.E.R.667E/D.E.R.331 (3:2) | MOWIOL 488 10% and E-SPERSE 100 1% | 345 | 7.7 | 787 |
| C | D.E.R. 669E/D.E.R.3 30 (1:2) | E-SPERSE 100 2.5%/ E-SPERSE 700 2.5% | 553 | 5.3 | 589 |
| D | D.E.R.667E/D.E.R.331 (1:1) | ATSURF 108 6%/ E-SPERSE 100 2% | 295 | 5.2 | 636 |
| E* | D.E.R. ™ 671 | | 500 | ~1.5 | 1050 |
| F | D.E.R. 331 | | 350 | 0.38 | 187 |

[A]For dispersions A-C, the epoxy resins were melt-blended to form a homogenous mixture, respectively at temperatures of 150° C., and then dispersed in water in PARR reactor at 100° C. Dispersion F was dispersed in water in PARR reactor at 50° C. Dispersion D was prepared in an extruder at a dispersion temperature of 120° C., total epoxy feed rate = 100 g/min and initial aqueous (IA) stream federate = 13.33 g/min
[B]Dispersant based on total epoxy resin solids.
[C] The ratio in the parenthesis indicate the ratio of epoxy resins in the blend
[D]Weight average epoxy molecular weight of the epoxy blend (weighted average of the two epoxy resins)
[E]EEW of the epoxy dispersion was calculated as a weighted average of the epoxy blend composition.
*Comparative

Example 2

Clear Coating Tests

Epoxy dispersions were formulated with amine hardener and cured at room temperature for 4 days and followed by accelerated curing at 60° C. for 20 hours. Dispersions A to C contain a high EEW solid epoxy. Dispersion E only contains low EEW solid epoxy. The experimental results are summarized in Table 3, below. All epoxy dispersions have good film formation properties without using any coalescing solvent. With comparable film thickness, the epoxy blend with greater than 30% high Mw solid epoxy show dramatically improved impact resistance and MEK double rub results. Meanwhile, adhesion and conical bend properties are still acceptable.

TABLE 3

| Dispersion | Coating thickness (μm) | Adhesion | Forward Impact (Joule) | Reverse Impact (Joule) | Conical Bend | MEK |
|---|---|---|---|---|---|---|
| A | 70 | 5 | 4.1/5.4 | 1.8/9.0 | p | >200 |
| C | 70 | 5 | 6.8/11.3 | 2.3/4.5 | p | >200 |
| E | 40 | 5 | 1.1/1.1 | <0.5 | p | 45 |

*1 Joule = 8.85 inch-lb
** impact has 2 numbers: first-the coating begins to show any kind of mar or delamination; second-the coating begins to show cracking
*** Adhesion rating "5" indicates good adhesion, Conical Bend rating "p" indicated a pass the standard test.

Example 3

Formulated Coating Test

Unless otherwise indicated, room temperature curing is applied for 28 days. Two dispersions A and B were tested in a simple enamel coating formulation with $TiO_2$ pigment.

The experimental epoxy dispersions of the present invention have low film formation temperature without additional coalescence, enabling the low VOC formulation.

TABLE 4

|  | Paint A* | Paint B |
|---|---|---|
| MEK double rub 30 days (solvent resistance) | 250 | 500 |
| Pencil hardness 30 days | HB | 3H |
| Impact resistance (direct) (Joule) | 3.4 | 2.3 |

*1 Joule = 8.85 inch-lb

The film forming temperature of the inventive blend dispersion B is below 5° C., suggesting that it can be formulated coalescent-free. As shown in Table 4, above, the inventive blend exhibits much better solvent resistance and hardness than the comparative Paint A low Mw epoxy dispersion.

Example 4

The indicated epoxy dispersion modified cement was made, as follows, from the indicated epoxy dispersions G and H made according to the procedure below. Epoxy dispersions F and B as shown in Table 2 were used to seed acrylic polymerization to produce dispersions G and H, respectively.

Into a round bottom flask was added 82 grams of the indicated epoxy dispersion dispersion in Table 1 prepared by the batch dispersion process, above, (epoxy content=45 wt %), and the flask was purged with nitrogen gas while maintaining at 60° C. While stirring, 2.5 milligrams of ferrous sulfate as a one wt % aqueous solution was added. Premixed 6.60 grams of methyl methacrylate and 1.65 grams of methacrylic acid was injected the mixture into the reactor over 30 minutes. At the same time a 5 wt % aqueous solution of tert-butyl peroxide and a 5 wt % aqueous solution of sodium hydroxymethanesulfinate so as to add a total of one wt % of each component relative to monomer weight was fed into the reactor over 45 minutes. Maintaining the reaction at 60° C. for 60-90 minutes and then allowing to cool to 25° C. and filtering through a 190 micrometer filter gave a resulting dispersion comprising epoxy resin particles containing 77 wt % epoxy resin, 8 wt % dispersant (PVOH) and 15 wt % alkali soluble shell comprising a copolymer of methacrylic acid and methyl methacrylate, with wt % relative to total combination of epoxy resin, dispersing aid and alkali soluble polymer shell. The resulting dispersion has a particle size of 360 nanometers.

TABLE 5

Epoxy/acrylic hybrid dispersions

| Dispersion | Epoxy Resin | ASR shell[A] | Dispersant/Loading %[B] | Particle size (nm) |
|---|---|---|---|---|
| G (Comparative) | D.E.R. 331 | 25 wt % to epoxy | MOWIOL 488 PVOH 10% 1% E-Sperse 100 | 360 |
| H | D.E.R.667E/D.E.R.331 (3:2) | 25 wt % to epoxy | MOWIOL 488 PVOH 10% 1% E-Sperse100 | 360 |

[A] a copolymer of methylmethacrylate and methacrylic acid in a ratio of 4:1
[B] Dispersant based on total epoxy resin solids Mortar Testing:

For a two component Epoxy modified mortar, testing was conducted based on a repair mortar formulation made from mixing epoxy dispersion with cement. For A Sika product Sika Armatec™ 110 EpoCem™ (Brock White Co LLC, Saint Paul Minn.), Part C dry mix of amorphous silica and cement was used, to evaluate the performance of the epoxy blend dispersion of the present invention by replacing the part A and B in the commercial formulation with an epoxy RDP dry mix. Mortar preparation and Flexural Strength tests was conducted according to ASTM C580-02 (2008) Standard Test Method for Flexural Strength and Modulus of Elasticity of Chemical-Resistant Mortars, Grouts, Monolithic Surfacings, and Polymer Concretes.

Cement Formulation:

To mix the mortar, a Hobart mixer (model N-50, Hobart, Canada) was used at speed '1', with the mixing bowl and mixing blade secured to the mixer. Sika Part C was added to the running mixer containing epoxy dispersion and additional water over a period of two minutes and was allowed to mix uninterrupted for 30 more seconds. The mixer was turned off, the blade and bowl removed, and the mix was stirred by hand with a hard, rubber spatula for one minute. The bowl and blade were reattached, and the mixture was mixed again for one minute. Then, the bowl was detached without removing the blade and spatula, and the mixture was slaked with a uniformly moist towel covering the bowl for ten minutes. The unit was reassembled and mixed for 15 seconds.

Standard molds were assembled, making sure that the end-pins are screwed tightly into the cold-roll steel Mold (51×51×254 mm) (from Humboldt Test Equipment Schiller Park, Ill.). The molds were filled half way and then air pockets were forced out using a rubber compound tamper (152×13×25 mm) (Humboldt Test Equipment, Schiller Park, Ill.). The molds were filled completely and tamped again. A long, metal spatula was guided across the top surface of the material in the mold in a seesaw pattern to create a flat, even surface and remove any excess material. The molds were covered with a labeled piece of Mylar™ and placed into storage for 72 hours. Then, the molded bars were removed and an initial length measurement was taken. The bars were left in a climate controlled room. The samples were set up on a United Floor Model Smart-1 Machines Model SFM-150 KN (United Testing Systems, Inc., Flint, Mich.). A 1 kN load cell was used for testing. A span of 229 mm is used. The other dimensions are 51×51 mm. The load was slowly applied until failure.

TABLE 6

Summary of Epoxy Modified Mortar Samples

| Composition | Dispersion G* D.E.R. 331 25% ASR shell and 10% MOWIOL ™ 488 based on epoxy | Dispersion H D.E.R. 667E/331 (3:2) 25% ASR shell 10% MOWIOL ™ 488 based on epoxy ASR |
|---|---|---|
| Solid content (wt %) | 40 | 40 |
| Epoxy Tg (° C.) | −18 | 22 |
| Epoxy MW (g/mol) | 380 | 6150 |
| Polymer (wt % of Sika C) | 7.0 | 7.0 |
| Sand and Cement | Sika C | |
| Defoamer | Propylene oxide modified Kaolin clay (40% clay), 0.047 wt % of Sika C | |
| Kaolin clay | KAMIN ™ HG-90, 14 wt % to polymer | |
| Final Water Load (wt % of Sika C)[a] | 15.66 | 15.66 |
| 7 Days Flexural strength (MPa) | 7.7 | 12.6 |
| Deviation (MPa) | 0.7 | 1.5 |

[a]Water load was calculated based on the non-volatile epoxy and amine component in Sika A and water in epoxy dispersion was counted and additional water was needed.;
*Comparative As shown in Table 6, above the epoxy blend dispersion of the present invention Dispersion G can be used to modify cement without any amine hardener, and the high Mw epoxy blend dispersion demonstrates much improved flexural strength when compared to the Dispersion G from Table 5 in cured cement applications.

What is claimed is:

1. An aqueous epoxy resin dispersion comprising, based on the total solids weight in the epoxy resin dispersion,
   i) from 20 wt. % to 60 wt. %, a high molecular weight (Mw) epoxy resin;
   ii) from 30 wt. % to 70 wt. %, a liquid epoxy resin; and
   iii) from 2 wt. % to 20 wt. %, a dispersant having an interfacial tension such that a drop of the mixture of the dispersant in a melt of the high Mw and liquid epoxy resin blend against water is less than 2 dynes/cm,
   wherein the epoxy resin dispersion is a homogeneous dispersion; the high Mw epoxy resin has an epoxide equivalent weight of from 800 to 10000 g/eq, and a weight average molecular weight of from 3000 to 40000; and the liquid epoxy resin has an epoxide equivalent weight of from 100 to 200 g/eq, and a weight average molecular weight of from 200 to 600.

2. The epoxy resin dispersion according to claim 1 wherein the dispersion has a particle size of from 0.1 to 2 µm.

3. The epoxy resin dispersion according to claim 1 wherein each of the high Mw epoxy resin and the liquid epoxy resin is a polyglycidyl ether of a polyol.

4. A coating composition comprising the epoxy resin dispersion according to claim 1.

5. A cement composition comprising the epoxy resin dispersion according to claim 1.

6. An aqueous dispersion process comprising:
   i) providing from 20 to 60 wt. %, based on total dispersion solids, of a high Mw epoxy resin with an epoxide equivalent weight of from 800 to 10000 g/eq, and a weight average molecular weight of from 3000 to 40000;
   ii) providing from 30 to 70 wt. %, based on total dispersion solids, of a liquid epoxy resin with an epoxide equivalent weight of from 100 to 200 g/eq, and a weight average molecular weight of from 200 to 600;
   iii) providing from 2.0% to 20%, based on total dispersion solids, of a dispersant that has an interfacial tension such that a drop of the mixture of the dispersant in a melt of the high Mw and liquid epoxy resin blend against water is less than 2 dynes/cm;
   iv) providing water to achieve a solid content of >75 wt %; and
   v) continuously emulsifying said epoxy resin composition in the water in the presence of said dispersant to produce a high internal phase emulsion under conditions sufficient to melt the high Mw epoxy blend resin.

7. The dispersion process according to claim 6 wherein each of the high Mw epoxy resin and the liquid epoxy resin is a Bisphenol-A diglycidyl ether or Bisphenol-F diglycidyl ether or polyglycol diglycidyl ether.

8. The dispersion process according to claim 6 wherein the dispersant is a sulfate of an ethoxylated phenol, an ethoxylated phenol, nonionic copolymer of ethylene oxide and propylene oxide dispersants having a molecular weight of from 7,000 to 20,000, a polyvinyl alcohol, or any mixture thereof.

9. The dispersion process according to claim 6, further comprising providing additional water to dilute the high internal phase emulsion to lower viscosity, to 40-60 wt % solid in the dispersion.

* * * * *